US009991482B2

United States Patent
Ishikawa et al.

(10) Patent No.: US 9,991,482 B2
(45) Date of Patent: Jun. 5, 2018

(54) MAGNESIUM-AIR FUEL CELL

(71) Applicant: AQUA POWER SYSTEM, JAPAN, Ota-ku, Tokyo (JP)

(72) Inventors: Tadashi Ishikawa, Tokyo (JP); Yoshiaki Hasebe, Tokyo (JP)

(73) Assignee: AQUA POWER SYSTEM, JAPAN, Tokyo (JP)

( * ) Notice: Subject to any disclaimer, the term of this patent is extended or adjusted under 35 U.S.C. 154(b) by 478 days.

(21) Appl. No.: 14/763,524

(22) PCT Filed: Jan. 27, 2014

(86) PCT No.: PCT/JP2014/051713
§ 371 (c)(1),
(2) Date: Jul. 27, 2015

(87) PCT Pub. No.: WO2014/115879
PCT Pub. Date: Jul. 31, 2014

(65) Prior Publication Data
US 2015/0380693 A1    Dec. 31, 2015

(30) Foreign Application Priority Data

Jan. 28, 2013    (JP) .................................. 2013-013684

(51) Int. Cl.
*H01M 2/04*    (2006.01)
*H01M 2/34*    (2006.01)
(Continued)

(52) U.S. Cl.
CPC ........... *H01M 2/0452* (2013.01); *H01M 2/30* (2013.01); *H01M 2/34* (2013.01); *H01M 12/06* (2013.01);
(Continued)

(58) Field of Classification Search
CPC ........ H01M 2/30; H01M 2/34; H01M 2/0255; H01M 2/0452; H01M 2220/10; H01M 2220/30; H01M 12/06; H01M 12/08
See application file for complete search history.

(56) References Cited

U.S. PATENT DOCUMENTS 3,963,519 A * 6/1976 Louie ...................... H01M 6/38
429/116
2011/0212369 A1 * 9/2011 Eom ................... H01M 2/0255
429/407

FOREIGN PATENT DOCUMENTS

JP          55-15783 U       1/1980
JP          55-116473 U      8/1980
(Continued)

OTHER PUBLICATIONS

International Search Report dated Mar. 4, 2014, corresponding to International application No. PCT/JP2014/051713.

*Primary Examiner* — Miriam Stagg
*Assistant Examiner* — Lilia Nedialkova
(74) *Attorney, Agent, or Firm* — Hauptman Ham, LLP

(57) ABSTRACT

Provided is a magnesium-air fuel cell in which a conductive state is achieved when a lid is fastened, and a nonconductive state is achieved when the lid is loosened, so that the power supply can be turned ON and OFF based on a fastening state of the lid. A lid includes a lower end portion that comes into contact with a main body at a time of fastening, an anode body inserted in the main body, and an electrode plate made of metal coupled to an end of the anode body. The electrode plate includes a first terminal at least positioned at the lower end portion. The main body includes a second terminal positioned on a surface that comes into contact with the lower end portion of the lid at the time of fastening the lid.

(Continued)

Electrical conduction is achieved when the first terminal and the second terminal come into contact with each other.

4 Claims, 7 Drawing Sheets

(51) Int. Cl.
*H01M 12/06* (2006.01)
*H01M 2/30* (2006.01)
*H01M 12/08* (2006.01)
*H01M 2/02* (2006.01)

(52) U.S. Cl.
CPC .......... *H01M 12/08* (2013.01); *H01M 2/0255* (2013.01); *H01M 2220/10* (2013.01); *H01M 2220/30* (2013.01)

(56) References Cited

FOREIGN PATENT DOCUMENTS

| JP | 56-43576 U | 4/1981 |
|---|---|---|
| JP | 57-198873 U | 12/1982 |
| JP | 58-68671 U | 5/1983 |
| JP | 3109505 U | 5/2005 |

* cited by examiner (a)

(b)

MAGNESIUM-AIR FUEL CELL

RELATED APPLICATIONS

The present application is a National Phase of International Application Number PCT/JP2014/051713, filed Jan. 27, 2014, and claims priority from, Japanese Application Number 2013-013684, filed Jan. 28, 2013.

TECHNICAL FIELD

The present invention relates to a fuel cell that generates power by using a fuel such as air or water, and particularly relates to a magnesium-air fuel cell that uses water.

BACKGROUND

Conventionally, magnesium-air fuel cells are known that generate power by using water. For example, Patent Literature 1 discloses a magnesium-air fuel cell that includes a cylindrical main body, a cathode active material filled in the main body, and a pair of electrode plates (a cathode plate and an anode plate) inserted in the cathode active material.

CITATION LIST

Patent Literature

{PTL 1} Japanese Utility Model No. 3109505

SUMMARY

Technical Problem

In the magnesium-air fuel cell disclosed in Patent Literature 1, when water is supplied to the cathode active material filled in the main body, a potential difference is produced between the electrode plates, whereby electromotive force is produced. Furthermore, with a configuration of detachably screwing a cap onto a threaded open end of the main body, the water can be easily injected into the main body, and the cathode material can be easily replaced. However, the magnesium-air fuel cell cannot be provided with a switch for turning ON and OFF a power supply. Thus, once a conductive state is achieved, the power continues to be generated until the discharging is completely terminated.

An object of the present invention is to provide a magnesium-air fuel cell, as an improved version of the conventional magnesium-air fuel cells, in which a conductive state is achieved when a lid is fastened, and a nonconductive state is achieved when the lid is loosened, so that the power supply can be turned ON and OFF based on a fastening state of the lid.

Solution to Problem

To solve the problem, the present invention is directed to a magnesium-air fuel cell having a height direction and including: a main body, a cathode body fixed to the main body, and a lid detachably attached to the main body.

In the magnesium-air fuel cell according to the present invention, the lid includes: a lower end portion that comes into contact with the main body at a time of fastening, an anode body inserted in the main body, and an electrode plate made of metal coupled to an end of the anode body. The electrode plate includes a first terminal at least positioned at the lower end portion. The main body includes a second terminal positioned on a surface that comes into contact with the lower end portion of the lid at the time of fastening the lid. Electrical conduction is achieved when the first terminal and the second terminal come into contact with each other.

According to a preferred aspect of the present invention, the electrode plate may include a fixed portion fixed on an outer surface of the lid via a fixing member, a downward extending portion extending toward an outer side of the outer surface from the fixed portion and extending toward the lower end portion along an outer circumference surface of the lid, and the first terminal that is bent toward an inner side from the downward extending portion and covers part of the lower end portion of the lid.

According to another preferred aspect of the present invention, the lid may include a screw portion formed on an inner circumference surface, the main body may include a cylindrical portion to which the lid is fit, and the second terminal may be disposed on an outer side of at least part of a base end edge of the cylindrical portion.

According to a still another preferred aspect of the present invention, the second terminal may have a tongue piece shape positioned at an upper end of a screw portion formed on an inner circumference wall extending in the main body, and the first terminal may be in contact with the second terminal in a state where the lid is fastened to the main body. The electrode plate may be elastic in the height direction.

According to a still another preferred aspect of the present invention, the electrode plate may be elastic in the height direction.

Advantageous Effects of Invention

In the magnesium-air fuel cell according to the present invention, when the lid is completely fastened to the main body, the first terminal, positioned at the lower end portion of the electrode plate attached to the lid, comes into electrical contact with the second terminal provided to the main body, whereby the fastening state of the lid can be used as a power switch for the cell. When the cell is used as a power supply device, for example, by adjusting the fastening state of the lid, turning ON and OFF of the power supply can be quickly repeated and quickly switched.

BRIEF DESCRIPTION OF DRAWINGS

The drawings illustrate embodiments of the present invention including optional and preferred embodiments as well as essential features of the invention.

DESCRIPTION OF EMBODIMENTS

First Embodiment

Figure 1:
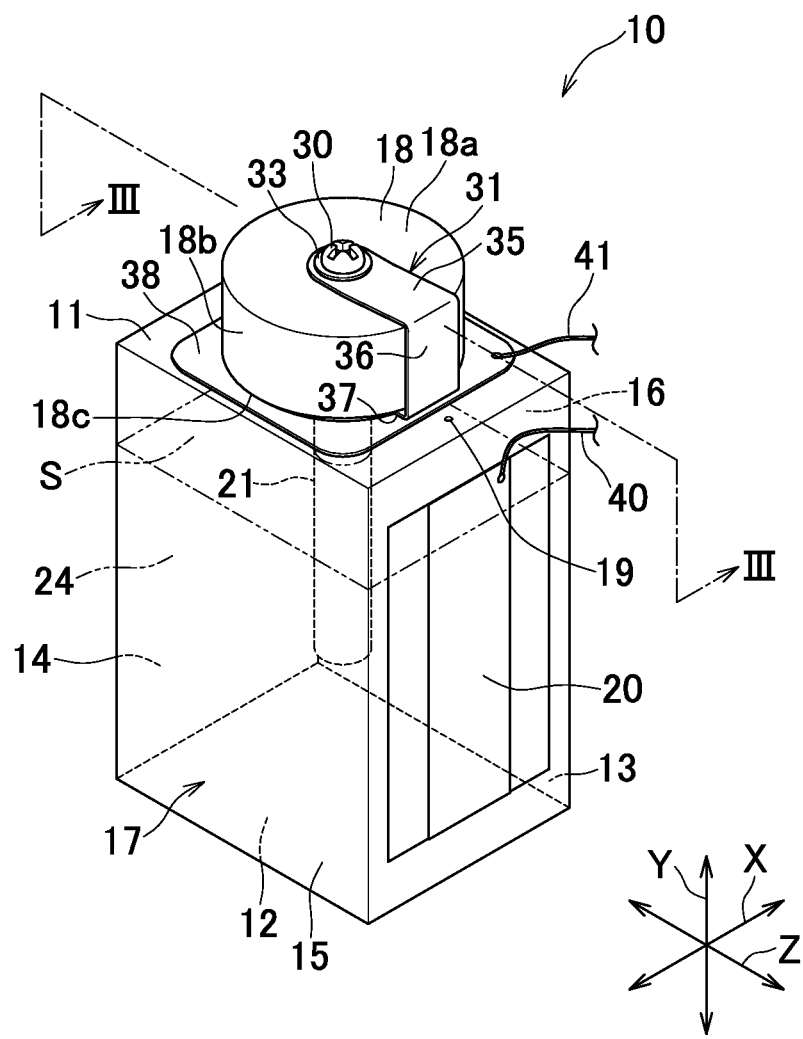
FIG. 1 is a perspective view of a magnesium-air fuel cell in a first embodiment of the present invention.
Figure 2:
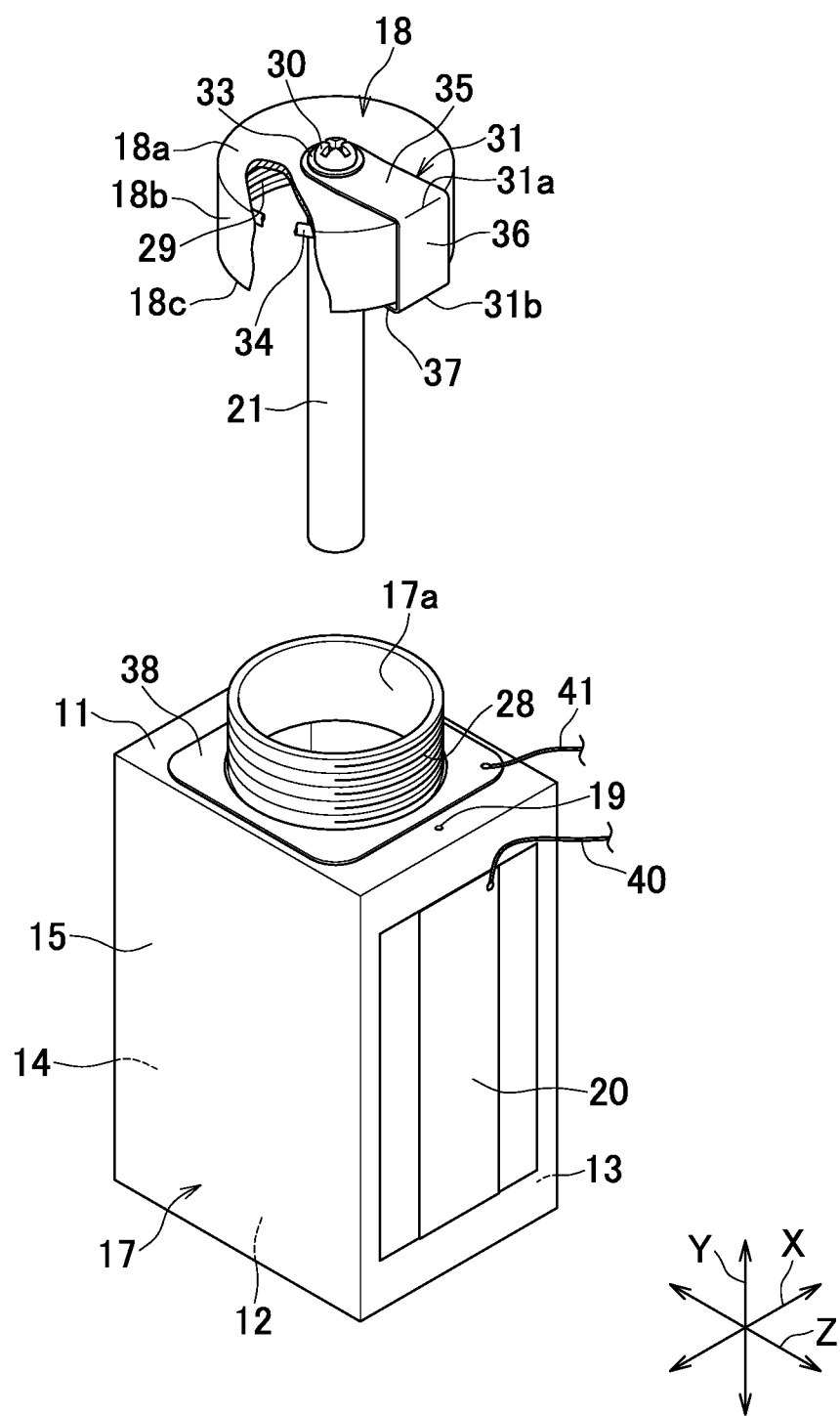
FIG. 2 is a partially cutout exploded perspective view of the magnesium-air fuel cell.
Figure 3:
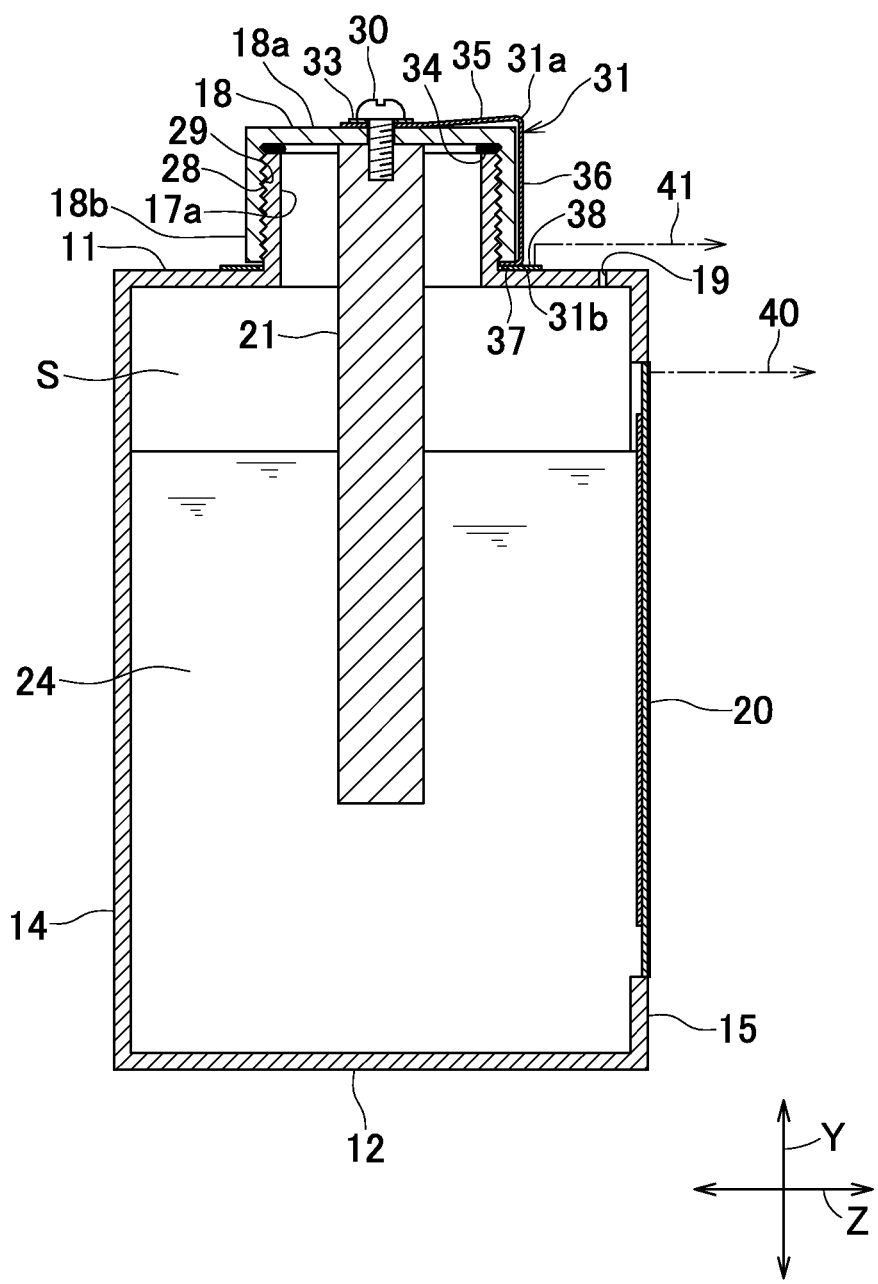
FIG. 3 is a schematic cross-sectional view taken along line III-III in FIG. 1.

As illustrated in FIGS. 1 and 2, for a magnesium-air fuel cell 10 according to the present embodiment, a height direction Y and a width direction X, and a depth direction Z are defined. The magnesium-air fuel cell 10 includes a main body 17 having a rectangular parallelepiped shape. The main body 17 includes: first and second surfaces 11 and 12 facing each other in the height direction Y; third and fourth surfaces 13 and 14 facing each other in the depth direction Z; and a fifth surface 15 and a sixth surface 16 facing each other in the width direction X. The magnesium-air fuel cell 10 includes a lid 18 that is detachably attached to the main body 17. A through hole 19 is formed in the first surface 11. Hydrogen gas, generated when an electrochemical reaction occurs in the magnesium-air fuel cell 10, is discharged through the through hole 19.

The main body 17 is made of a rigid plastic material. A cathode body (air electrode) 20 having a thin-rectangular plate shape is positioned on the third surface 13. An anode body 21 having a rod shape is removably inserted in the main body 17. A predetermined amount of reaction liquid can be injected into the main body 17. The main body 17 includes a liquid injected area 24 and a space S positioned above the liquid injected area 24. The liquid injected area 24 is formed by injecting the liquid in an amount corresponding to about 60 to 80% of the capacity of the entire main body 17. A cylindrical portion 17a is disposed at the center of the first surface 11 of the main body 17, and a screw portion 28 is formed over the entire outer circumference surface of the cylindrical portion 17a.

The lid 18 includes: an upper surface 18a; a hollow cylindrical portion 18b that extends toward the main body 17 from an outer circumference edge of the upper surface 18 and has a screw portion 29 formed on the inner circumference surface; and a lower end portion 18c that faces the first surface 11 of the main body 17. An opening is formed at the center of the upper surface 18a of the lid 18. A fixing member (screw) 30 is fit to the opening and has an end portion attached to the anode body 21 and a head portion exposed. One end of an electrode plate 31, having a form of a metal thin plate, is fixed between the fixing member 30 and the upper surface 18a of the lid 18 with a washer 33 disposed between the fixing member 30 and the one end. The electrode plate 31 extends downward along the cylindrical portion 18b from the upper surface 18a of the lid 18. When an operator holds and attaches the lid 18 in such a manner that the anode body 21 is inserted into the cylindrical portion 17a of the main body 17 and then rotates the lid 18 in a single direction, the screw portion 29 of the lid 18 engages with the screw portion 28 of the main body 17, whereby the lid 18 can be fastened to the main body 17.

The electrode plate 31 has a bent shape to match an outer shape of the lid 18. The electrode plate 31 includes: a first bent portion 31a bent along the outer circumference edge of the upper surface 18a of the lid 18; and a second bent portion 31b bent along a lower end portion of the lid 18. The electrode plate 31 includes: a fixed portion 35 having a distal end fixed to the upper surface 18a of the lid 18 with the fixing member 30; a downward extending portion 36 positioned along the outer side surface of the lid 18 between the first bent portion 31a and the second bent portion 31b; and a first terminal 37 including the second bent portion 31b that is bent toward the inner side in such a manner that the first terminal 37 covers a part of the lower end portion 18b of the lid 18 and extends toward the inner side. A second terminal 38 is disposed on the first surface 11 and on an outer circumference of abase end of the cylindrical portion 17a of the main body 17. The second terminal 38 has an opening formed at the center and has a form of a metallic square thin plate. One end of a lead wire 40 is attached to a corner portion of the cathode body 20 by soldering or the like. One end of a lead wire 41 is attached to a corner portion of the second terminal 38 by soldering or the like. An O-ring 34 is disposed between the main body 17 and the lid 18 to prevent the reaction liquid from leaking.

The magnesium-air fuel cell 10, with such a configuration, is started as follows. First of all, the lid 18 is detached from the main body 17 and the reaction liquid is injected into the main body 17. Then, the lid 18 is screwed onto the cylindrical portion 17a of the main body 17, again. In a state where the lid 18 is completely fastened to the cylindrical portion 17a, the first terminal 37, positioned at the lower end portion 18c of the lid 18, comes into electrical contact with the second terminal 38 positioned at the first surface 11 of the main body 17. Thus, an electrically conductive state of the magnesium-air fuel cell 10 is achieved. In the conductive state, the reaction liquid reacts with an oxidation catalyst, thereby causing an ionization reaction between the cathode body 20 and the anode body 21. Then, electrons produced from the ionized anode body 21 react with oxygen in the cathode body 20 and with water in the reaction liquid to cause a discharge reaction. Thus, due to the resultant potential difference between the cathode body 20 and the anode body 21, predetermined electromotive force is produced. When such electrochemical reaction occurs, magnesium hydroxide and reactant gas (hydrogen gas) are produced in the main body 17. Electrolyte other than water such as salt water may be used as the reaction liquid. When the lid 18 is detached and thus the anode body 21 in the main body 17 is pulled out, the electrochemical reaction is terminated and thus the electromotive force is no longer produced. When the power generation efficiency degrades, the liquid in the main body 17 can be discharged and new reaction liquid can be injected by detaching the lid 18.

The cathode body 20 preferably has a multilayered structure in which a first layer (electrode layer) and a second layer (active layer) are stacked on top of the other. The first layer is made of a conductive material such as a carbon material. The second layer is formed of a cathode active material such as activated carbon. The cathode body 20 is preferably air-permeable-liquid-impermeable as a whole. The cathode body 20 may have a three-layer structure, in which a third layer (collector layer) having a plate shape and the first and the second layers are stacked on top of the other, to achieve a higher power collecting efficiency. The third layer is formed of conductive metal. An electrode active material with relatively high ionization tendency such as magnesium metal, aluminum, and zinc may be used for the anode body 21.

Figure 4:
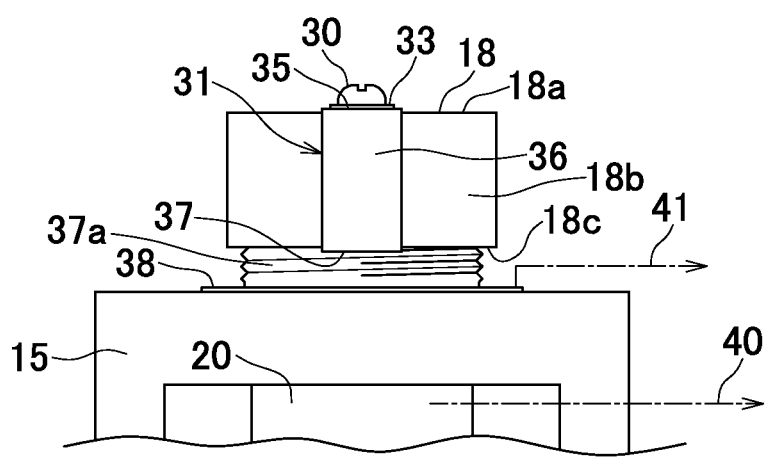
FIG. 4(a) is a partially enlarged view of the cell in a nonconductive state.
FIG. 4(b) is a partially enlarged view of the cell in a conductive state.
Figure 4:
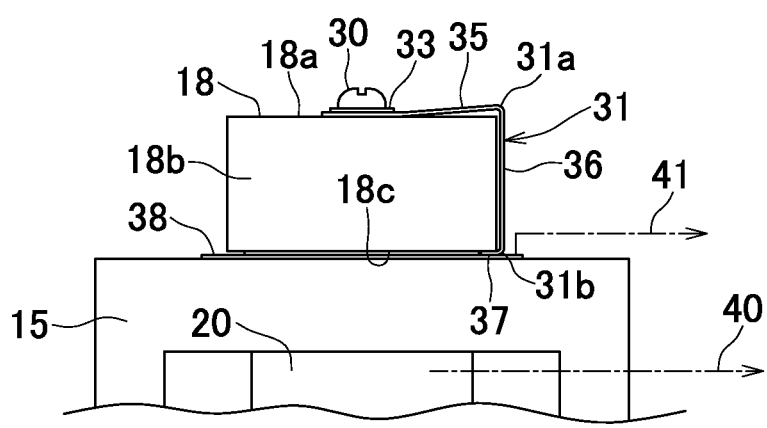

As illustrated in FIG. 4 (a), in a state where the lid 18 is incompletely fastened, the first terminal 37 of the electrode plate 31 is separated from, and thus is not in contact with the second terminal 38 positioned on an outer circumference of the base end of the cylindrical portion 17a of the main body 17. By achieving the state where the lid 18 is incompletely fastened (disconnected state), the magnesium-air fuel cell 10 can be switched from the conductive state to the nonconductive state. Thus, the lid 18, which is fastened or loosened, can be used as a power switch. In the magnesium-air fuel cell 10, similar to but different from the one according to the present invention, the discharge reaction starts as soon as the reaction liquid is injected into the main body 17, and the a predetermined amount of electromotive force is continuously generated while decreasing over time until the discharging is terminated. Thus, once the discharging reaction begins, the discharging continues until the lid 18 is completely detached from the main body 17 and the anode body 21 in the main body 17 is taken out. Thus, when the electromotive force needs to be intermittently generated, an operator has to go through a cumbersome procedure of detaching the lid 18 from the main body every time the power supply is turned OFF.

On the other hand, in the magnesium-air fuel cell 10 according to the present embodiment, the nonconductive state can be achieved by loosening the lid 18 so that the first terminal 37 is separated from the second terminal 38, without completely separating the lid 18 from the main body 17 and completely taking out the anode body 20 from the inside of the main body 17. Thus, the power supply can be easily turned ON and OFF. Thus, when, for example, the magnesium-air fuel cell 10 is used for a portable light device with the lead wires 40 and 41 connected to a light bulb (light source), the nonconductive state is achieved and thus the power supply is turned OFF by loosening the lid 18 fastened to the cylindrical portion 17a so that the first terminal 37 is separated from the second terminal 38. Then, when the lid 18 is again fastened so that the first terminal 37 and the second terminal 38 come into contact with each other, the power supply is turned ON.

The electrode plate 31, in the bent state, is attached to the lid 18 with the fixing member 30 disposed in between. Thus, the first bent portion 31a is positioned while being separated from the outer circumference edge of the upper surface of the lid 18. The first bent portion 31a is not in contact with, and thus is separated from the outer circumference edge, whereby the downward extending portion 36 of the electrode plate 31 has elasticity in the height direction Y. Thus, when the first terminal 37 comes into sliding contact with the second terminal 38, the downward extending portion 36 elastically deforms to slightly move upward, whereby the impact is absorbed. All things considered, a plurality of the first and second terminals 37 and 38 that have come into sliding contact with each other are not worn or deformed. The second terminal 38 only needs to be disposed to be in contact with the first terminal 37 in the state where the lid 18 is completely fastened to the main body 17, and thus at least needs to be positioned on an outer side of part of a base end edge of the cylindrical portion 17a.

Second Embodiment

Figure 5:
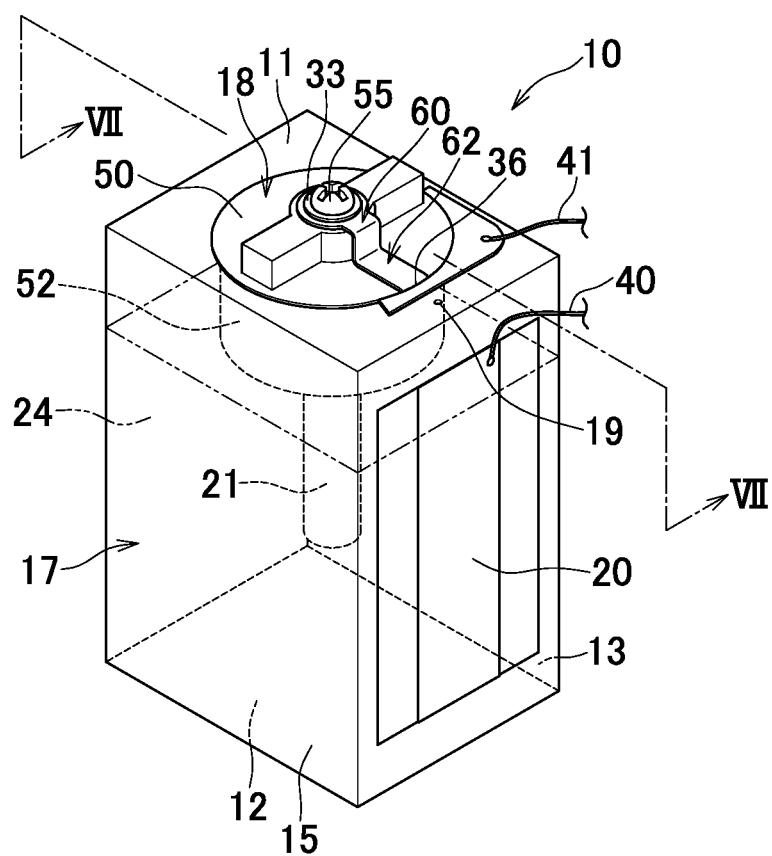
FIG. 5 is a perspective view of a magnesium-air fuel cell in a second embodiment.
Figure 6:
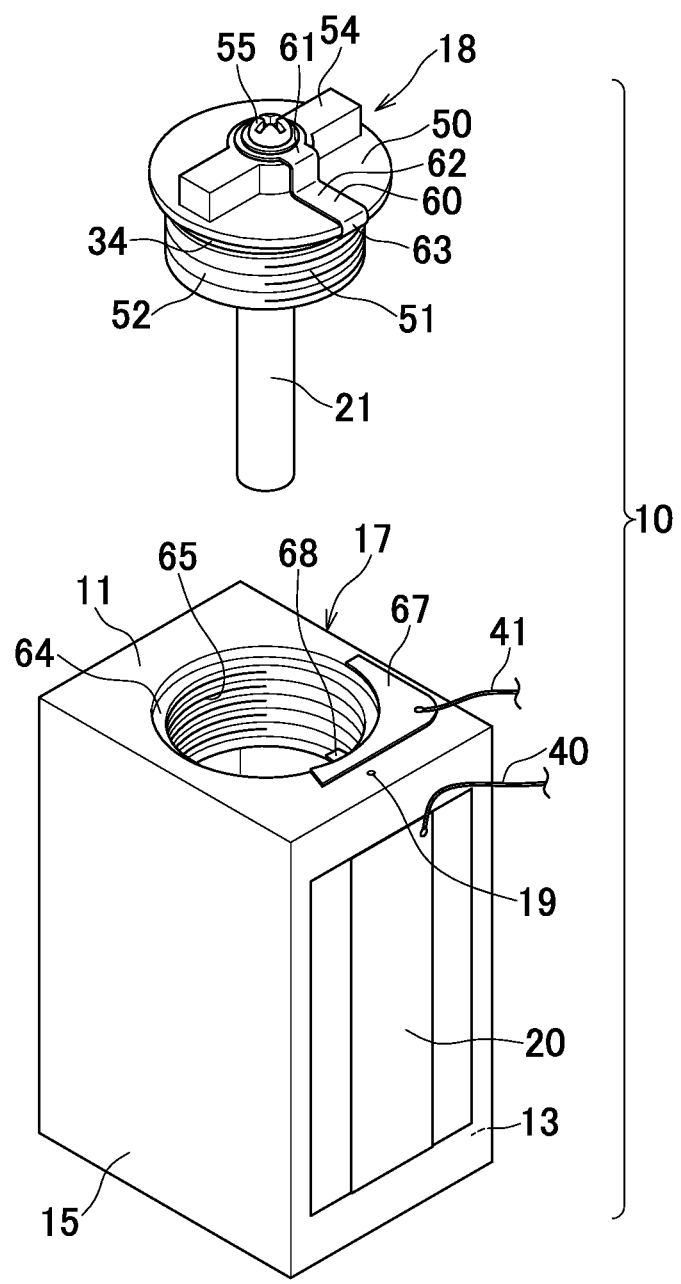
FIG. 6 is an exploded perspective view of the magnesium-air fuel cell.
Figure 7:
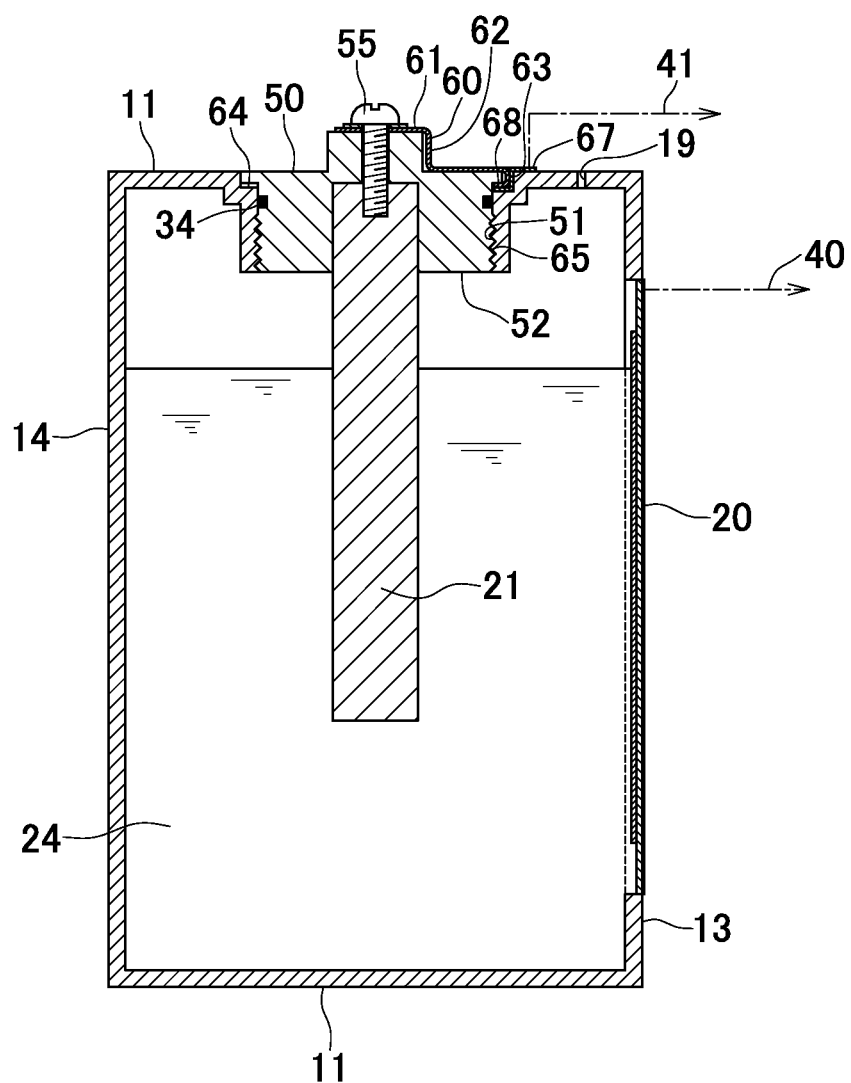
FIG. 7 is a schematic cross-sectional view taken along line VII-VII in FIG. 5.

In the present exemplary embodiment illustrated in FIG. 5, the lid 18 includes: a circular base end portion 50; and a cylindrical inserted portion 52 having a screw portion 51 on an outer circumference surface extending from the base end portion 50. A holding portion 54 is disposed on the base end portion 50 of the lid 18. The holding portion 54, protruding from the outer surface of the lid 18, is used for rotating the lid 18 so that the lid 18 is fit to the main body 17. A fixing member (screw) 55 made of metal is inserted in an opening formed at a center portion of the holding portion 54. One end of the fixing member 55 is attached to an end of the anode body 21 inserted in the inserted portion 52. A first electrode plate 60 includes: a fixed portion 61 fixed to the center portion of the holding portion 54 with the fixing member 55; a downward extending portion 62 extending downward from the fixed portion 61 along the outer circumference of the holding portion 54 and then extending to the outer circumference edge of the base end portion 50 along the outer surface of the base end portion 50; and a first terminal 63 bent toward the inner side along the outer circumference edge of the base end portion 50.

The first surface 11 of the main body 17, thicker than other surfaces, has an opening 64 at the center portion, and has a screw portion 65 on an inner circumference wall extending toward the inner side from the open end. The screw portion 65 engages with the screw portion 51 of the inserted portion 52 of the lid 18. A second electrode plate 67, made of metal and having a form of a thin plate, is disposed on an outer circumference of the opening 64 in the first surface 11. The lead wire 41 is attached to the center of the second electrode plate 67. A second terminal 68, having a form of a tongue piece, is formed on one side portion of the inner circumference surface of the second electrode plate 67. The second terminal 68 extends toward the opening 64, and is positioned at an upper portion (upper stage) of the screw portion 65. In the magnesium-air fuel cell 10 having the configuration described above, when the lid 18 is removed from the main body 17, the operator, holding the holding portion 54, inserts the inserted portion 52 of the lid 18 into the opening 64 of the main body 17 and rotates the holding portion 54 in a single direction. Thus, the screw portion 51 of the inserted portion 52 engages with the screw portion 65 positioned at the inner circumference wall of the main body 17, whereby the lid 18 can be screwed onto the main body 17. The O-ring 34 is disposed in a recess portion, extending over the outer circumference of an upper end of the inserted portion 52 of the lid 18.

As illustrated in FIG. 4, when the lid 18 is completely fastened to the main body 17, the first terminal 63 is in contact with the second terminal 68, extending on the upper end of the screw portion 65. The first terminal 63 is contact with the second terminal 68 of the second electrode plate 67 when the lid 18 is completely fastened to main body 17 as described above, whereby the electrically conductive state of the magnesium-air fuel cell 10 is achieved and the desired electromotive force can be generated. In the conductive state, the base end portion 50 of the lid 18 substantially flushes with the first surface 11 of the main body 17. Thus, clear outer appearance can be achieved, and the magnesium-air fuel cell 10 can be downsized from the configuration in the first embodiment where the entire lid 18 is exposed to the outside of the main body 17. As in the first embodiment, the first electrode plate 60 is attached to the lid 18 while being bent, and thus a portion bent along the outer circumference edge of the base end portion 50 has elasticity. Thus, the impact is absorbed when the first terminal 63 comes into sliding contact with the second terminal 68, whereby a plurality of the first and second terminals 63 and 68 that have come into sliding contact with each other are not worn or deformed. As illustrated in the figure, the second terminal 68 only needs to be disposed to be in contact with the first terminal 63 when the lid 18 is completely fastened. Thus, the second electrode plate 67 needs not to be large enough to cover the entire outer circumference of the opening 64, whereby a lower material cost can be achieved compared with the case where the entire outer circumference is covered.

Components of the magnesium-air fuel cell 10 are not limited to the above-described components, and any other component used for an item of this type may be used. The lengths of the components in the embodiments may be appropriately changed in accordance with a required amount of electromotive force. The magnesium-air fuel cell 10 may be used as a power supply device for ships and large tankers, and may be used as a power supply device for electric apparatuses such as mobile information terminals.

The invention claimed is:

1. A magnesium-air fuel cell having a height direction and comprising:
   a main body;

a cathode body fixed to the main body; and a lid detachably attached to the main body, wherein the lid includes: a lower end portion that comes into contact with the main body at a time of fastening; an anode body inserted in the main body; and an electrode plate made of metal coupled to an end of the anode body, the electrode plate including a first terminal at least positioned at the lower end portion, wherein the main body includes a second terminal positioned on a surface that comes into contact with the lower end portion of the lid at the time of fastening the lid, wherein electrical conduction is achieved when the first terminal and the second terminal come into contact with each other, and wherein the electrode plate includes: a fixed portion fixed on an outer surface of the lid via a fixing member; a downward extending portion extending toward an outer side of the outer surface from the fixed portion and extending toward the lower end portion along an outer circumference surface of the lid; and the first WI anal that is bent toward an inner side from the downward extending portion and covers part of the lower end portion of the lid.

2. The magnesium-air fuel cell according to claim 1, wherein the lid includes a screw portion formed on an inner circumference surface, wherein the main body includes a cylindrical portion to which the lid is fit, and wherein the second terminal is disposed on an outer side of at least part of a base end edge of the cylindrical portion.

3. The magnesium-air fuel cell according to claim 1, wherein the second terminal has a tongue piece shape positioned at an upper end of a screw portion formed on an inner circumference wall extending in the main body, and the first terminal is in contact with the second terminal in a state where the lid is fastened to the main body.

4. The magnesium-air fuel cell according to claim 1, wherein the electrode plate is elastic in the height direction.

* * * * *